(12) United States Patent
Arakawa et al.

(10) Patent No.: US 7,543,688 B2
(45) Date of Patent: Jun. 9, 2009

(54) BRAKE APPARATUS FOR A VEHICLE

(75) Inventors: Haruo Arakawa, Toyota (JP); Takahisa Yokoyama, Anjo (JP); Takayuki Takeshita, Anjo (JP); Chihiro Nitta, Anjo (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 460 days.

(21) Appl. No.: 11/290,520

(22) Filed: Dec. 1, 2005

(65) Prior Publication Data

US 2006/0118367 A1 Jun. 8, 2006

(30) Foreign Application Priority Data

Dec. 7, 2004 (JP) ............................. 2004-354039

(51) Int. Cl.
*F16D 55/08* (2006.01)
(52) U.S. Cl. .................. 188/72.7; 188/162; 188/196 V; 188/343
(58) Field of Classification Search ................ 188/72.7, 188/162, 196 V, 343, 71.2
See application file for complete search history.

(56) References Cited

U.S. PATENT DOCUMENTS 4,784,244 A * 11/1988 Carre et al. ................. 188/156
5,388,669 A 2/1995 Holl et al.
6,012,556 A * 1/2000 Blosch et al. ............... 188/71.8
6,412,610 B1 * 7/2002 Drennen et al. ............. 188/156
2002/0108818 A1 * 8/2002 Imoto et al. ................. 188/72.7
2004/0178028 A1 * 9/2004 Farmer et al. ............... 188/162

FOREIGN PATENT DOCUMENTS

JP 6-17856 1/1994
JP 2003-287069 10/2003

OTHER PUBLICATIONS

K. Ogawa and I. Katoh, "Kikougaku", Morikita Shuppan Co., Ltd., Mar. 1, 1976, pp. 164-165, First edition, $7^{th}$ print. (cited in specification).

* cited by examiner

*Primary Examiner*—Xuan Lan Nguyen
(74) *Attorney, Agent, or Firm*—Buchanan Ingersoll & Rooney PC

(57) ABSTRACT

A brake apparatus is provided for braking a vehicle wheel, and includes a brake member rotated integrally with the wheel, a friction member mounted on the vehicle to be in contact with the brake member, a rotation member rotated integrally with the wheel, an electric motor, and a differential shift device. A motion converter is provided for converting a rotating motion of the motor into a thrust motion of the friction member to be pressed onto the brake member. For example, one of three components of the differential shift device is movable in response to rotation of the rotation member, another one is movable in response to rotation of the electric motor, and the rest is movable in response to operation of the motion converter.

9 Claims, 5 Drawing Sheets

BRAKE APPARATUS FOR A VEHICLE

This application claims priority under 35 U.S.C. Sec. 119 to No. 2004-354039 filed in Japan on Dec. 7, 2004, the entire content of which is herein incorporated by reference.

BACKGROUND OF THE INVENTION

1. Field of the Invention

The present invention relates to a brake apparatus for a vehicle, particularly relates to an apparatus for pressing a friction member onto a brake member by means of rotating force of a vehicle wheel, to restrain the wheel from rotating.

2. Description of the Related Arts

As for a brake apparatus for a vehicle, it has been proposed that a friction member is pressed onto a brake member by means of an electric motor to restrain a wheel from rotating. In Japanese Patent Laid-open Publication No. 2003-287069, for example, there is disclosed a motor driven brake apparatus which converts a rotation of an electric motor into a thrust motion for driving a piston, to press a friction pad onto a disc rotor, thereby to produce braking force. In the above Publication, it has been proposed that a controller for controlling the electric motor is integrally installed in a disc brake device, and that a wire harness for a wheel speed sensor is connected to the controller.

With respect to a conventional disc brake apparatus actuated by hydraulic pressure, it has been proposed to save energy of a power source by employing a piston pump, instead of a prior master cylinder or an electrically actuated pump. The piston pump is disposed in the vicinity of a disc rotor or disc brake device, to convert the rotating force of the wheel into a driving force for the piston pump, which generates hydraulic pressure for actuating a disc brake piston to apply pressing force to a friction member, thereby to apply the braking force to the wheel.

For example, there is disclosed a brake actuator with electromagnet, cam and hydraulic piston components in Japanese Patent Laid-open publication No. 6-17856, which corresponds to the U.S. Pat. No. 5,388,669. The brake actuator includes an additional disc (identified as a second coupling half) provided in parallel with a brake disc on a common axis to be rotated independently of the disc, and connects or disconnects the discs by means of an electromagnetic clutch, which is capable of controlling the pressing force applied to the discs in response to electric current fed to the clutch. The additional disc is provided with a cam race on its circumferential surface, with a radius of the cam being varied along the circumference. The piston is in contact with the cam race, and generates the hydraulic pressure in response to rotation of the disc, to act as the piston pump. The friction power of the clutch is set by properly adjusting the electric current fed to the electromagnetic clutch, whereby the rotating torque of the cam disc and the driving force of the piston for the piston pump associated with the cam disc are set, so that the cylinder pressure, and therefore the braking force can be adjusted.

According to the brake actuator as described in the Japanese Patent Laid-open Publication No. 2003-287069, however, the braking force is produced with the friction pad being pressed onto the disc rotor in response to rotation of the electric motor, a large consumption of electric power is required comparing with prior brake apparatuses, and a countermeasure is required for obtaining the braking force, after supply of the electric power to the motor is terminated. Therefore, the apparatus shall be necessarily high in price.

On the other hand, according to the brake actuator as described in the U.S. Pat. No. 5,388,669, the driving energy is drawn only from the rotating force of the wheel, the braking force can not be applied when the vehicle stops. In addition, the brake actuator requires the electromagnetic clutch, piston pump and cum mechanism, and practically further requires a reservoir tank and many other components. Consequently, the brake actuator is not practical in view of an installation space, weight, cost and productivity, so that it is difficult to put it on a market in fact. As the accuracy for adjusting the braking force depends on the accuracy for transmitting the torque of friction clutch, the braking control shall result in being unstable and inaccurate, in general. Therefore, it is very difficult to achieve such an accurate control as required by the present braking system. Also, as brake fluid has been filled between the piston pump and the cylinder provided for the disc brake device, cubic variation due to temperature difference or the like can not be absorbed. Therefore, it is difficult to provide a desired braking characteristic.

Furthermore, as for a reduction mechanism for providing large reduction ratio, a Ferguson Mechanical Paradox has been known heretofore. For example, on pages 164-165 of a book entitled "Kikougaku", First edition, 7th print, written by K. Ogawa and I. Katoh and published on Mar. 1, 1976 by Morikita Shuppan Co. Ltd., it is explained that a pair of sun gears with different number of inner theeth, i.e., stationary sun gear and rotating sun gear, are engaged with a common planetary gear.

SUMMARY OF THE INVENTION

Accordingly, it is an object of the present invention to provide a brake apparatus for pressing a friction member onto a brake member rotated integrally with a vehicle wheel to restrain the vehicle wheel from rotating, with a simple structure and high reliability, to be capable of applying sufficient braking force with a small consumption of electric power, by means of an electric motor.

And, it is another object of the present invention to provide the brake apparatus with a simple structure and high reliability, to be capable of applying the braking force certainly, even after supplying the electric power to the electric motor is terminated.

In accomplishing the above object, the brake apparatus is provided for braking a wheel of a vehicle, and includes a brake member rotated integrally with the wheel relatively to the vehicle, and a friction member mounted on the vehicle to be capable of being in contact with the brake member. The friction member is adapted to be pressed onto the brake member to restrain the wheel from rotating. The brake apparatus further includes a rotation member fixed to the wheel and rotated integrally with the wheel, an electric motor for controlling an output thereof in response to an electric signal, and a differential shift device having more than three components movable relatively to one another, with motions of two of the components being defined, thereby to define motions of the rest of the components. And, a motion converter is provided for converting a rotating motion of the electric motor into a thrust motion of the friction member to be pressed onto the brake member. In the brake apparatus, one of the components of the differential shift device is adapted to be movable in response to rotation of the rotation member, another one of the components of the differential shift device is adapted to be movable in response to rotation of the electric motor, and at least one of the rest of the components of the differential shift device is adapted to be movable in response to operation of the motion converter.

The brake apparatus may further include an electromagnetic clutch device disposed between the rotation member and one of the components of the differential shift device, and the electromagnetic clutch device is adapted to engage one of the components of the differential shift device to be movable in response to rotation of the rotation member.

Or, the brake apparatus may further include a one-way clutch device disposed between the rotation member and one of the components of the differential shift device, and the one-way clutch device may be adapted to engage one of the components of the differential shift device to be movable in response to rotation of the rotation member.

Preferably, the differential shift device includes a planetary gear mechanism having planetary gears. The planetary gear mechanism may include a Ferguson Mechanical Paradox.

The brake apparatus may further include a frictional load device for applying friction force to a rotation axis of the electric motor to restrain the electric motor from rotating, a manually operated braking member operated in response to input force applied thereto by a vehicle driver, a load transmitting member for transmitting the input force of the manually operated braking member, to the frictional load device, and a load transmitting changeover device for selecting a first state for transmitting the input force of the manually operated braking member to the frictional load device through the load transmitting member, or a second state without transmitting the input force to the frictional load device. The frictional load device may be adapted to apply a torque to the rotation axis of the electric motor in proportion to the input force of the manually operated braking member, in a direction opposite to the rotating direction of the rotation axis of the electric motor.

BRIEF DESCRIPTION OF THE DRAWING

The above stated object and following description will become readily apparent with reference to the accompanying drawings, wherein like referenced numerals denote like elements, and in which.

DESCRIPTION OF THE PREFERRED EMBODIMENTS

Figure 1:
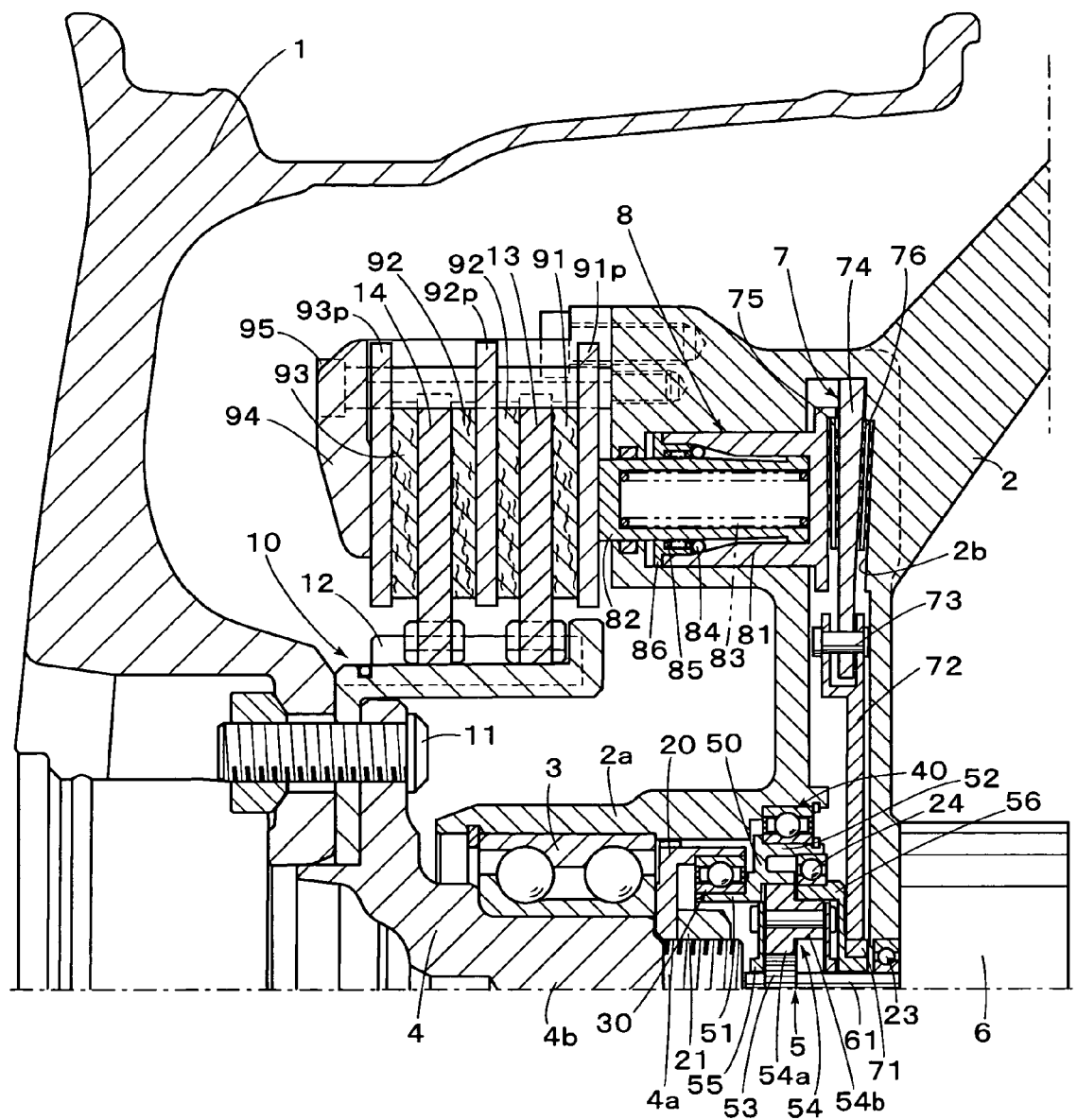
FIG. 1 is a cross sectional view of a part of a brake apparatus for a vehicle according to an embodiment of the present invention.

Referring to FIG. 1, there is illustrated a brake apparatus according to an embodiment of the present invention, which particularly relates to a disc brake apparatus disposed in a vehicle wheel 1. A vehicle suspension includes a knuckle 2 having a cylindrical portion 2a opened outside of the vehicle. In the cylindrical portion 2a, a hub 4 is rotatably supported through a bearing 3. The hub 4 is served as a rotation member of the present invention, and secured to the wheel 1 by bolt-and-nut 11, with a disc rotor 10 clamped between them and disposed in a space defined between the wheel 1 and the knuckle 2. The disc rotor 10 is served as a brake member according to the present invention, and formed with a cylindrical portion, on the outer circumferential surface of which a slide pin 12 is secured in parallel with the rotation axis of the wheel 1. A couple of annular members 13 and 14 are slidably mounted on the slide pin 12, in parallel with the rotation axis of the wheel 1. Accordingly, the hub 4, disc rotor 10 and wheel 1 are integrally rotated relatively to the knuckle 2, and therefore relatively to the vehicle body, at a rotational speed in response to the vehicle speed.

The hub 4 is formed at an opposite side to the wheel 1 with an end portion 4a, on the outer circumferential surface of which thread grooves are formed. A bearing 3 is fitted into an inner hole of the cylindrical portion 2a of the knuckle 2, so that the end portion 4a of the hub 4 extends from the bearing 3. Then, after an annular member 20 is mounted on the end portion 4a of the hub 4, a nut 21 is engaged with the thread grooves of the end portion 4a. The annular member 20 constitutes a wheel speed detection device and has an outer circumferential surface formed with outer teeth. There is disposed a one-way clutch 30 that includes an outer ring, which is fitted into the inside of the open end portion of the annular member 20 and secured thereto, and includes an inner ring, which is secured to a cylindrical portion 51 of a ring gear 50, i.e., input portion and a component of a planetary gear shift mechanism 5 served as a differential shift device. According to the one-way clutch 30, when the vehicle moves forward, the rotating force is transmitted from the annular member 20 to the ring gear 50. When the vehicle stops and moves backward, however, the one-way clutch 30 rotates freely, so that the rotating force is not transmitted to the ring gear 50. Instead of the one-way clutch 30, an electromagnetic clutch device (not shown) may be provided to be connected or disconnected in response to an electric signal, so as to function in the same manner as the one-way clutch 30.

The ring gear 50 has another cylindrical portion 52, which is mounted on the knuckle 2 through another one-way clutch 40. According to the one-way clutch 40, when the vehicle moves forward, it rotates freely, whereas, when the vehicle stops and moves backward, its rotation is blocked. The planetary gear shift mechanism 5 includes an input axis 61 secured to a sun gear 53, which is served as another input portion, and includes a ring gear 56, which is served as an output portion. The input axis 61 is connected to a rotor (not shown) of the electric motor 6, and the ring gear 56 is connected to a pinion 71 of a rack-and-pinion mechanism, which constitutes the motion converter 7. There are provided bearings 23 and 24 for rotatably supporting the input axis 61 and ring gear 56, respectively. Between the sun gear 53 and the ring gears 50 and 56, there are disposed three careers 54, each of which has a large diameter portion 54a and small diameter portion 54b, respectively, and which are rotatably supported on a connection member 55. Each large diameter portion 54a of the careers 54 is engaged with the sun gear and the inner teeth formed on the cylindrical portion 52 of the ring gear 50, whereas the small diameter portion 54b is engaged with the inner teeth formed on the ring gear 56 which acts as the output.

Figure 3:
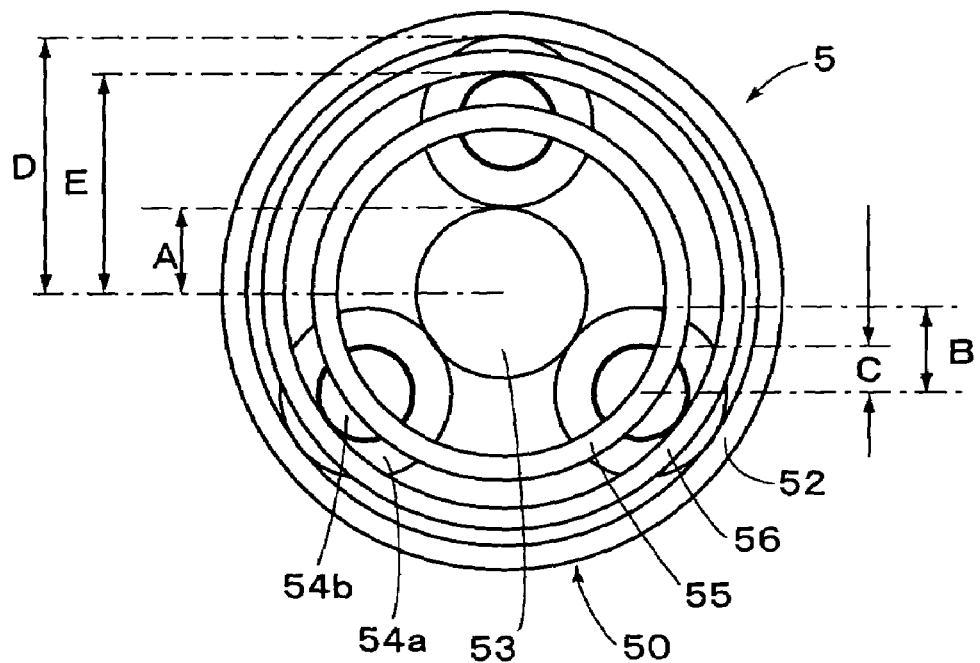
FIG. 3 is a schematic front view of a planetary gear shift mechanism according to an embodiment of the present invention.
Figure 4:
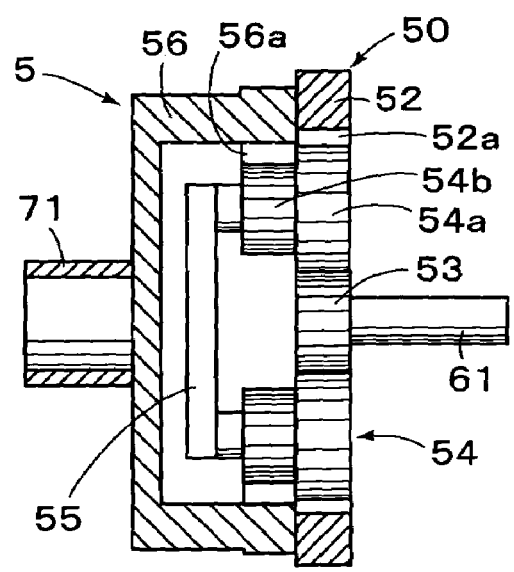
FIG. 4 is a schematic cross sectional view of a planetary gear shift mechanism according to an embodiment of the present invention.

FIGS. 3 and 4 schematically illustrate relationships among the gears constituting the planetary gear shift mechanism 5, wherein the same reference numerals are used as those identifying the corresponding elements as shown in FIG. 1. In FIG. 3, a dimension (A) indicates a radius of the sun gear 53, a dimension (B) indicates a radius of the large diameter portion 54a of each career 54, a dimension (C) indicates a radius of the small diameter portion 54b of each career 54, a dimension (D) indicates a radius of the inner teeth formed on the cylindrical portion 52 of the ring gear 50, and a dimension (E)

indicates a radius of the inner teeth formed on the ring gear 56, each dimension of which is proportional to each number of teeth.

Instead of the planetary gear shift mechanism 5, may be employed such a differential gear shift mechanism that includes an internal gear, and an external gear which is in contact with an inner surface of the internal gear, and which has a different number of teeth from the number of teeth of the internal gear. The differential gear shift mechanism further includes a known Oldham's coupling mechanism (not shown) which is adapted to restrain the external gear from rotating.

Figure 2:
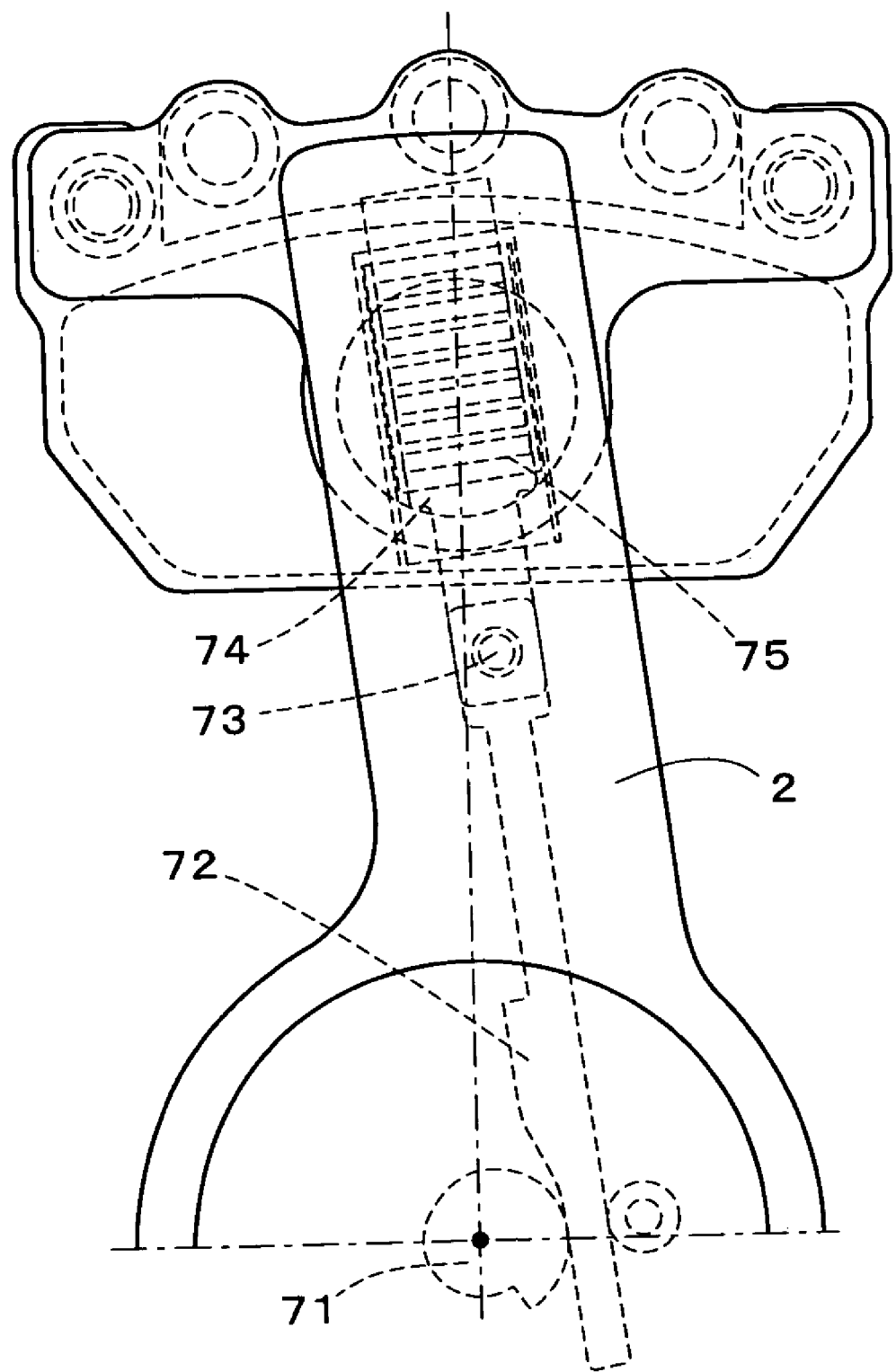
FIG. 2 is a side view of a motion converter according to an embodiment of the present invention.

Referring back to FIGS. 1 and 2, a rack 72 is connected to a wedge member 74 through a connecting pin 73, at its opposite end to the portion engaged with the pinion 71. The wedge member 74 is formed with tapered surfaces inclined to each other at a predetermined angle, on opposite sides of its central axis. The wedge member 74 is disposed to be clamped between the piston member 8 and inner surface of a hollow portion 2b of the knuckle 2, with the roller members 75 and 76 being disposed between them. As shown in FIG. 2, each of the roller members 75 and 76 includes a plurality of rollers accommodated in a case, so as to guide the wedge member 74 to move smoothly. Therefore, when the rotating motion of the electric motor 6 is converted into the thrust motion by means of the rack-and-pinion mechanism, the wedge member 74 is driven downward in FIG. 1.

The piston member 8 includes a cylinder with a bottom 81 (hereinafter, simply referred to as a cylinder 81) and another cylinder with a bottom 82 (hereinafter, simply referred to as a cylinder 82) coupled with each other, such that their opening portions are faced with each other. A compression spring 83 is disposed between the cylinders 81 and 82, so as to urge them to be away from each other. The cylinder 81 is formed with a tapered inner surface to be gradually enlarged in diameter toward its open end. Between the tapered inner surface of the cylinder 81 and the outer surface of the cylinder 82, balls 84 and a compression spring 85 are disposed, and a stopper 86 is secured to the open end of the cylinder 81. Consequently, the cylinders 81 and 82 can be integrally advanced, i.e., moved leftward in FIG. 1, and the cylinder 82 can be advanced relatively to the cylinder 81.

Consequently, the piston member 8 as constituted above is advanced by driving force applied to it through the roller members 75 and 76, in response to a downward movement of the wedge member 74 in FIG. 1, so that a first friction member 91 is pressed outward (toward the wheel 1), in parallel with the rotation axis of the wheel 1. According to the present embodiment, the friction member includes the first friction member 91, second friction members 92 and third friction member 93, which are secured to a first back plate 91p, second back plate 92p and third back plate 93p, respectively, and slidably supported on support pins 95, which penetrate the back plates 91p, 92p and 93p, and which secure an arm member 94 to the knuckle 2. Therefore, thrust force applied to the first friction member 91 is transmitted to the annular member 13, second friction members 92, annular member 14, third friction member 93 and arm member 94, in sequence. As the annular members 13 and 14 are slidably supported on the disc rotor 10, in parallel with the rotation axis of the wheel 1, to provide a so-called floating system, they are pressed evenly by the friction members 91, 92 and 93. With the friction members 91, 92 and 93 being worn, each clearance between each of them and the annular members 13 and 14 will be enlarged. According to the present embodiment, however, the piston member 8 has been constituted such that the cylinder 82 is advanced relatively to the cylinder 81, with the friction members being worn to be thinner. Therefore, those members can be held to be in tight contact with each other.

Next will be explained operation of the brake apparatus as constituted above, in the case where a braking operation is made, when the vehicle is traveling. As the wheel is rotating at a rotational speed in proportion to the vehicle speed when the vehicle is moving forward, the rotation of the wheel (together with the hub and etc.) is transmitted to the ring gear 50 served as the input portion to the planetary gear shift mechanism 5, through the one-way clutch 30. In this case, according to the characteristic of the planetary gear shift mechanism 5, the rotational speeds (number of rotations per minute) of two input axes and one output axis are bound to each other, in accordance with a Table (1) as shown below.

TABLE 1

| | (Rotational speed) |
|---|---|
| Wheel input axis | 1 |
| Motor input axis | Rm |
| Output axis | $A \cdot (B - C)/(2 \cdot B \cdot E) \cdot (Rm - 1) + 1$ |

Therefore, when the braking operation is not performed, the rotating force of the wheel will not be transmitted to the output axis, provided that the electric motor 6 is rotating at such a rotational speed (Rm) that the rotational speed of the output axis, i.e., $\{A \cdot (B-C)/(2 \cdot B \cdot E) \cdot (Rm-1)+1\}$, equals zero. This state may be identified from the view point of torque. At the outset, torque rates among the three axes have been fixed in accordance with such a relationship as indicated by a Table (2) as shown below. Therefore, if the torque of the input axis of the motor is fixed to zero, then the torque of the output axis becomes zero, whereby the vehicle is held in such a state that the braking force is not being applied.

TABLE 2

| | (Torque) |
|---|---|
| Wheel input axis | $D/A \cdot \{(B + C)/(B - C)\}$ |
| Motor input axis | 1 |
| Output axis | $-E/A \cdot \{2 \cdot B/(B - C)\}$ |

Figure 5:
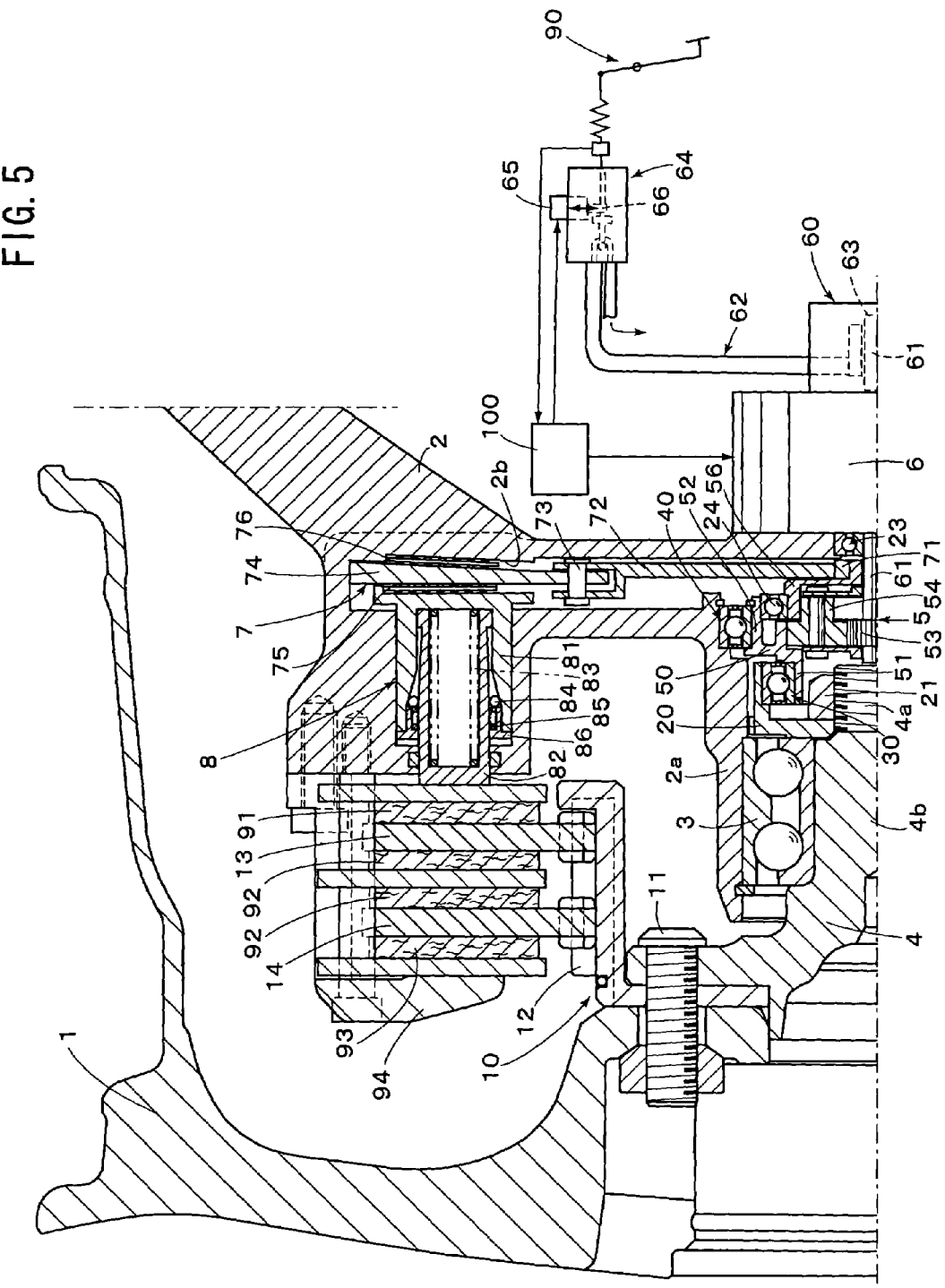
FIG. 5 is a cross sectional view of a part of a brake apparatus for a vehicle according to another embodiment of the present invention.

In other words, if the electric current fed to the electric motor 6 is shut-off such that the torque to be generated equals zero, the whole rotational speed of the wheel is provided to actuate the electric motor 6 to be rotated, whereas either torque or rotation is not generated for the output for the braking operation. Next, if the braking operation is made in such a state as mentioned above, the electric motor 6 is supplied with the electric current to generate the braking force in response to the amount of braking operation, on the basis of a control signal output from a controller (not shown). In this case, the electric current is provided by calculating the thrust force applied to the piston member 8 on the basis of the braking force as required, then calculating the torque of the output axis on the basis of the drawing force of the rack 72 for producing the thrust force, and then obtaining the torque of the input axis of the electric motor 6 for producing the drawing force, with reference to the Table (2) as shown above. In this case, a work function, or power (W) (=torque×rotational speed) obtained from the rotating wheel is larger enough than a power (W') required for applying the braking force, the electric motor 6 itself is not required for performing any work. In a normal working condition, therefore, as the rotational speed input from the wheel is large enough, the electric motor 6 is rotated in a reverse direction, i.e., in a direction opposite to the direction for applying the braking force, at the rotational speed obtained according to the Table (1), provided that the output axis for the braking operation is being rotated at a sufficient working speed. The electric motor 6 forced to rotate in the reverse direction generates counter-electromotive force, by which the electric current is fed to the side for applying the braking force, to create the torque. The electric current produced by the counter-electromotive force is controlled with PWM by a controller 100 as shown in FIG. 5 and explained later, to be adjusted to an appropriate current.

As the electric power is generated in the electric motor 6, with the wheel being rotated, to produce the torque, the braking force can be applied, without requiring the electric power from other power sources, so that sufficient braking force can be obtained, even in such an emergency case that supplying the power is terminated due to abnormality of the power source or the like.

Next will be explained about the operation in the case where the vehicle stops, or moves backward. In those cases, the braking operation will be equal to a normal braking operation performed only by the electric motor 6. At the outset, when the vehicle stops, any rotating power is not transmitted to the ring gear 50, which corresponds to the input portion of the planetary gear shift mechanism 5. And, when the vehicle moves backward, any rotating power is not transmitted to the ring gear 50 even if the annular member 20 rotates, because the one-way clutch 30 rotates freely. On the other hand, according to the one-way clutch 40, the ring gear 50 is blocked to rotate in such a direction that the braking operation is released when the ring gear 50 is set to be free. As a result, the planetary gear shift mechanism 5 substantially acts as the Ferguson Mechanical Paradox, which has two rotating axes of a motor input axis and a braking output axis, so that the torque is transmitted according to the relationship as shown in the Table (2). In this case, the energy can not be derived from the wheel, so that every energy required for the braking operation has to be generated by the electric motor 6. However, the energy consumption for braking the vehicle in its stopped state or during its backward movement is not so large that it may largely reduce energy-saving effect.

According to the present embodiment, therefore, a large reduction of energy consumption for braking the vehicle can be achieved. For example, when the vehicle is traveling at a speed equal to or higher than 10 km/h, all of the wheels can be braked only by means of the rotating energy of the wheels. And, when the vehicle is traveling at a speed lower than 10 km/h, the vehicle can be braked almost by means of the rotating energy of the wheels. In the case where the vehicle stops, however, it is required to supply the energy for actuating the electric motor 6. In order to compensate it, the following measure can be added, according to another embodiment of the present invention.

Figure 6:
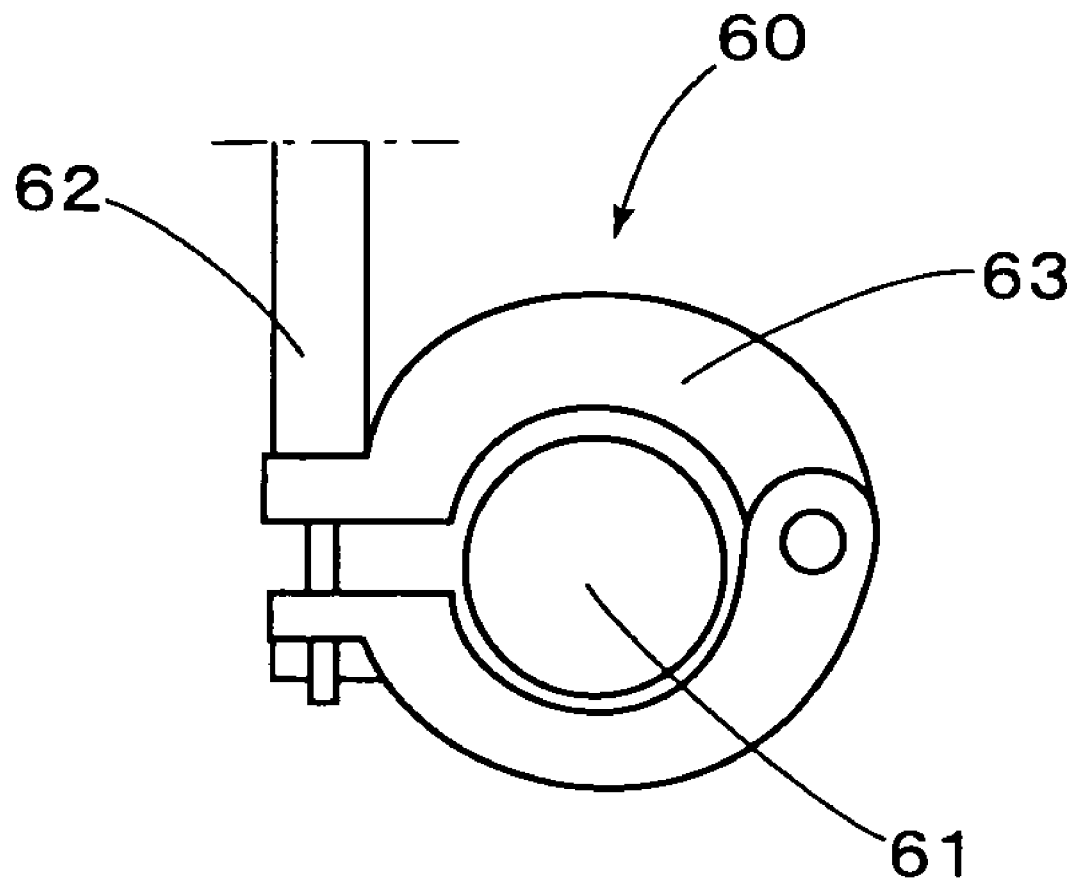
FIG. 6 is a side view of a frictional load applying device according to another embodiment of the present invention.

FIG. 5 illustrates the brake apparatus according to another embodiment, which includes a frictional load device 60 for applying friction force to the rotation axis of the electric motor 6 to restrain the same from rotating, and a load transmitting member 62, such as a wire or cable, for transmitting input force applied to a brake pedal 90 served as a manually operated braking member by a vehicle driver, to the frictional load device 60. FIG. 6 illustrates an example of the frictional load device 60, wherein a friction member 63 is provided to press the rotation axis 61 of the electric motor 6 or a rotation axis (not shown) movably connected thereto, so as to apply a torque to the rotation axis 61 or the like in proportion to the input force, in a direction opposite to the rotating direction of the axis 61 or the like. Between the brake pedal 90 and the frictional load device 60, there is provided a load transmitting changeover device 64, which selects a first state for transmitting the input force of the brake pedal 90 to the frictional load device 60, or a second state without transmitting the input force to the frictional load device 60, on the basis of electric signals output from a controller 100 capable of determining an abnormality of the system. For example, the load transmitting changeover device 64 includes a bar 66, which is moved back and forth by means of a solenoid 65 as shown in FIG. 5, and which is engaged with the load transmitting member 62 to block the input force transmitted from the brake pedal 90.

In operation, when it is determined that the control input fed from the controller 100 to the electric motor 6 is error, or when the control input is not fed thereto, the controller 100 or other device (not shown) capable of performing a diagnosis determines its abnormality, and outputs a signal indicative of the abnormality to the load transmitting changeover device 64. Then, as the solenoid 65 is actuated to release the bar 66 from blocking the input force, the force applied to the brake pedal 90 is transmitted to the frictional load device 60 through the load transmitting member 62, so that the frictional load device 60 is actuated. In this case, the energy required for the braking operation can be derived from the rotating force of the wheel as in the case where the electric motor 6 is in its normal operation, the frictional load device 60 may simply apply the friction, without performing any work. Therefore, a small stroke may be provided for the frictional load device 60 to fulfill a small clearance provided between the friction member 63 and the rotation axis 61 at the initial stage, and any specific stroke is not required for actuating the frictional load device 60, so that a lever-ratio thereof can be set to be large. As a result, such a servo-effect can be obtained that the same braking force as that obtained in the normal braking operation can be generated by a small force applied to the brake pedal 90. Also, any difference between a stroke of the brake pedal 90 in the normal operation and that in the abnormal operation is not made, to avoid a possibility for affecting a brake feeling.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A brake apparatus for braking a wheel of a vehicle, comprising:

a brake member rotated integrally with said wheel relatively to said vehicle;

a friction member mounted on said vehicle to be capable of being in contact with said brake member, said friction member being pressed onto said brake member to restrain said wheel from rotating;

a rotation member fixed to said wheel and rotated integrally with said wheel;

an electric motor for controlling an output thereof in response to an electric signal;

differential shift means having more than three components movable relatively to one another, with motions of two of said components being defined, thereby to define motions of the rest of said components; and a motion converter for converting a rotating motion of said electric motor into a thrust motion of said friction member to be pressed onto said brake member, one of said components of said differential shift means being movable in response to rotation of said rotation member, another one of said components of said differential shift means being movable in response to rotation of said electric motor, and at least one of the rest of said components of said differential shift means being movable in response to operation of said motion converter.

2. The brake apparatus according to claim 1, further comprising electromagnetic clutch means disposed between said rotation member and one of said components of said differential shift means, said electromagnetic clutch means engaging one of said components of said differential shift means to be movable in response to rotation of said rotation member.

3. The brake apparatus according to claim 1, further comprising one-way clutch means disposed between said rotation member and one of said components of said differential shift means, said one-way clutch means engaging one of said components of said differential shift means to be movable in response to rotation of said rotation member.

4. The brake apparatus according to claim 1, wherein said differential shift means includes a planetary gear mechanism having planetary gears.

5. The brake apparatus according to claim 4, wherein said planetary gear mechanism includes a Ferguson Mechanical Paradox.

6. The brake apparatus according to claim 1, wherein said differential shift means includes a differential gear shift mechanism having an internal gear, an external gear being in contact with an inner surface of said internal gear, and having a different number of teeth from the number of teeth of said internal gear, and an Oldham's coupling mechanism for restraining said external gear from rotating.

7. The brake apparatus according to claim 1, further comprising frictional load means for applying friction force to a rotation axis of said electric motor to restrain said electric motor from rotating, a manually operated braking member operated in response to input force applied thereto by a vehicle driver, a load transmitting member for transmitting the input force of said manually operated braking member to said frictional load means, and load transmitting changeover means for selecting a first state for transmitting the input force of said manually operated braking member to said frictional load means through said load transmitting member, or a second state without transmitting the input force to said frictional load means.

8. The brake apparatus according to claim 7, wherein said frictional load means is adapted to apply a torque to the rotation axis of said electric motor in proportion to the input force of said manually operated braking member, in a direction opposite to the rotating direction of the rotation axis of said electric motor.

9. The brake apparatus according to claim 7, wherein said load transmitting member includes a wire, and wherein said load transmitting changeover means includes a bar engaged with said wire for blocking the input force transmitted from said manually operated braking member.

* * * * *